US012606270B2

(12) United States Patent
Francis et al.

(10) Patent No.: US 12,606,270 B2
(45) Date of Patent: Apr. 21, 2026

(54) CRANKSET WITH HAPTIC FEEDBACK GENERATOR

(71) Applicant: CIXI, Annecy (FR)

(72) Inventors: Pierre Francis, Annecy (FR); Nicolas Ohlmann, Annecy (FR); Benjamin Pion, Chapeiry (FR)

(73) Assignee: CIXI, Annecy (FR)

( * ) Notice: Subject to any disclaimer, the term of this patent is extended or adjusted under 35 U.S.C. 154(b) by 16 days.

(21) Appl. No.: 18/727,597

(22) PCT Filed: Jan. 16, 2023

(86) PCT No.: PCT/FR2023/050055
§ 371 (c)(1),
(2) Date: Jul. 9, 2024

(87) PCT Pub. No.: WO2023/135399
PCT Pub. Date: Jul. 20, 2023

(65) Prior Publication Data
US 2025/0171107 A1     May 29, 2025

(30) Foreign Application Priority Data

Jan. 17, 2022     (FR) ..................................... 2200375

(51) Int. Cl.
B62M 6/55          (2010.01)
B62M 6/45          (2010.01)
B62M 6/90          (2010.01)

(52) U.S. Cl.
CPC .............. B62M 6/45 (2013.01); B62M 6/55 (2013.01); B62M 6/90 (2013.01)

(58) Field of Classification Search
CPC ................ B60L 50/20; B60L 2200/12; B60L 2240/423; B62M 6/45; B62M 19/00; B62M 6/55; B62M 6/90
See application file for complete search history.

(56) References Cited

U.S. PATENT DOCUMENTS 10,754,340 B1     8/2020   Corbett et al.

FOREIGN PATENT DOCUMENTS

| DE | 10 2015 111984 A1 | 2/2016 | |
|----|----|----|----|
| EP | 1 165 188 A2 | 1/2002 | |
| EP | 3 154 815 A1 | 4/2017 | |
| EP | 3408168 A1 | 12/2018 | |
| GB | 2452569 A   *   | 3/2009 | ........... G01D 5/2457 |

(Continued)

OTHER PUBLICATIONS

English translation of Written Opinion of the ISA for PCT/FR2023/050055; date of mailing Mar. 27, 2023; all pages. (Year: 2023).*

(Continued)

*Primary Examiner* — Calvin Cheung
(74) *Attorney, Agent, or Firm* — MARSHALL, GERSTEIN & BORUN LLP

(57)          ABSTRACT

A crankset includes a haptic feedback generator connected to the crankset and configured to deliver a resistive torque to the crankset. The crankset includes a haptic control unit that regulates the set rate by estimating a power applied to the pedal by rotating it and by decreasing or increasing the set rate so that said set rate increases with the power applied to the crankset.

16 Claims, 9 Drawing Sheets

(56) References Cited

FOREIGN PATENT DOCUMENTS

| GB | 2 530 621 A | 3/2016 |
|----|-------------|--------|
| WO | WO-2011/019743 A1 | 2/2011 |
| WO | WO-2015/191536 A1 | 12/2015 |
| WO | WO-2017/129275 A1 | 8/2017 |

OTHER PUBLICATIONS

International Search Report and Written Opinion, corresponding International Application No. PCT/FR2023/050055, mailing date Mar. 27, 2023.

* cited by examiner

CRANKSET WITH HAPTIC FEEDBACK GENERATOR

TECHNICAL FIELD

The present invention relates to a crankset including a haptic feedback generator allowing control of the kinematics, by regulating a specific haptic feedback. Such a crankset can be fitted to fixed pedal exercise devices or electrically powered vehicles, such as bicycles or cycles, and in particular velomobiles with a closed or semi-closed frame.

Thus, the invention relates to the technical field of land transport and can be implemented for leisure, sports or utility vehicles, for example for delivery vehicles.

The crankset according to the invention can also be used in the field of physical exercise in a pedal exercise device such as an exercise bike or elliptical bike.

BACKGROUND

Velomobiles are hybrid vehicles, combining aspects of a small car and those of a recumbent bicycle. These are vehicles expected to replace individual cars in urban areas. Velomobiles represent a much more economical and ecological alternative to the electric car.

Indeed, velomobile type cycles are small vehicles, and therefore relatively light. We can notably distinguish on the one hand velomobiles of low weight and volume, which are essentially similar to a recumbent bicycle equipped with a bodywork, and on the other hand velomobiles of greater weight and volume, closer to the car short.

Velomobiles of low weight and volume can weigh less than 50 kg, typically between 30 and 50 kg. These velomobiles can be either exclusively muscle powered or include electrical assistance, particularly for uphill assistance. The power of the electric assistance amounts to a few hundred Watts, typically 200 to 300 W. Their speed is relatively low, less than or close to 25 km/h. These velomobiles are designed to use cycle paths and lanes.

Velomobiles of significant weight and volume generally weigh several hundred kilograms. The propulsion of these velomobiles is preferably done electrically, their crankset then only being present for controlling acceleration and possibly for recharging a battery powering the electric motor of the velomobile. Electric propulsion is carried out by means of one or more motors with a total power of several kilowatts. Their speed is relatively high, with most models being designed to travel at 80-120 km/h. These velomobiles travel on roadways, like a classic automobile.

For example, Document EP3154815 describes such a vehicle.

The light weight of these velomobiles allows them, for the same battery carrying weight, to have greater range compared to an electric car.

Speed control can be done by the driver using the crankset. The setpoint applied to the propulsion motor is for example a function of the rotation rate of the crankset, and it is determined so that the motor accelerates the rotation of the wheel by the motor torque that it generates.

The internal mechanism of the crankset generally exerts a resistive torque, substantially opposite to the torque exerted by the user.

We know from documents EP3408168 and EP1165188 methods of controlling the electric motor based on the modeling of an inertia, modeling the acceleration with, for example, the consideration of a predetermined flywheel or the behavior of a usual mechanical bicycle crankset.

These devices are in particular not suitable for controlling vehicles such as velomobiles traveling at high speed, due to the fact that they require either a high pedaling rate which is experienced as unpleasant or a high number of gears implying complex transmission and use.

These devices generate an acceleration of the vehicle and a resistance torque proportional to the acceleration exerted by the user on the pedals, and propose the modeling of a reference inertia corresponding to known pedals and cycles, with a spread of the values of piloted vehicle speed allowing high speeds to be achieved.

The acceleration on the crankset is calculated by double temporal derivation, which involves complicated calculations that consume calculation time, and in particular based on a rate measured at high frequency and/or over a large time range.

As a result, the computing power of the control unit must be oversized, otherwise a discrepancy between variations in pedaling rate and variations in resistive torque is noted and felt by the user.

Existing alternatives require the use of direct speed or acceleration sensors. These sensors are more complex and therefore more expensive if we want them to have a response time compatible with the low inertia sought.

The same problem is observed on training devices such as exercise bikes or elliptical bikes using resistive torque controlled as a function of acceleration, as suggested in documents EP3408168 and EP1165188, with the same lag problems being felt between the action on the crankset and the variation in resistive torque corresponding to said action.

The technical problem of the invention is therefore to allow a dynamic and continuous adjustment of the pedaling rate, corresponding to said action, and in particular to make pedaling at high power sustainable.

SUMMARY OF THE DISCLOSURE

In order to respond to this technical problem, the invention proposes not to resort to complex modeling of known mechanical cranks but to use a set rate based on the power developed by the user to generate the resistive torque.

To do this, the invention proposes a crankset comprising:
means for estimating the rotation rate of the crankset;
a haptic feedback generator connected to the crankset and configured to deliver a resistive torque to the crankset; and
a control unit connected to the haptic feedback generator and to the means for estimating the rotation rate of the crankset, configured to control the rotation rate of the crankset to a set rate by modifying the resistive torque.

Such a crankset includes regulation of the pedaling rate by torque, which corresponds to a behavior relatively close to the behavior of a muscle-powered bicycle or velomobile type cycle.

The control unit regulates the target rate by estimating a power applied to the crankset by rotating it and by decreasing or increasing the target rate so that said target rate increases with the power applied to the crankset.

The pedaling rate is then controlled by simple comparison to a set value and estimation of the pedaling power, without any consideration of acceleration and therefore of double temporal derivative.

The computing power and the window for measuring position or rotation rate of the crankset can be reduced, and the haptic feedback is almost immediate and provides a more pleasant sensation, in the sense that it is similar to that observed on a traditional mechanical bike. In particular, the set rate, increasing with the power supplied to the crankset, ensures that pedaling remains pleasant at high power.

Furthermore, the applicant has discovered, based on numerous own studies, that pedaling is only pleasant and natural for the human body in a range of reduced pedaling rate, of a few units around 60 revolutions per minute and increasing slightly when the effort becomes greater in terms of pedaling power developed by the user.

Also, the invention proposes that the set rate depends linearly on the power.

More particularly, the set rate depends linearly on the power with a slope of between 0.05 and 0.25 revolutions per minute per watt, more particularly from 0.08 to 0.15 revolutions per minute per watt, and more particularly around 0.10 revolutions per minute per watt.

These values allow maintaining a rate perceived as comfortable over a wide range of powers developed by the user at the crankset level.

According to a particular embodiment, the crankset includes means for adjusting the rate at the origin.

A user can then continually adapt the haptic feedback parameters, for example if the rate imposed by the crankset is too low or too high over a pedaling power range.

According to another embodiment, the control unit is configured to determine the parameters of the target rate such as the slope and the ordinate at the origin of the target rate at the origin during a calibration.

The haptic feedback by modulation of the resistive torque can then be adapted specifically to each user, in particular by storing in an electronic or computer memory several profiles each having a setting adapted to a user.

The crankset can in particular be produced in the form of a reversible electric machine, including a generator operating mode, in which an electrical load controlled by the control unit forms the haptic feedback generator.

The crankset then does not require a mechanical system dedicated to resistive torque.

The electric current generated in generator operating mode can in particular be used to charge an electric battery, or power any electrical device, such as for example a mobile telephone.

The energy dissipated at the crankset during braking by the resistive torque can then be recovered and returned, for example for an electric motor controlled by means of the crankset, or to a device charger such as a telephone for example.

The reversible electric machine may include a motor operating mode, in which electric current from an electric battery is used to generate motor torque on the crankset.

The resistive torque can then be made a driving force, and thus be used to generate a driving effect for the pedals, for example to simulate a descent, where the wheels would be driven and would in return drive the pedals.

The invention also relates to an electric propulsion vehicle including a crankset as described above, said crankset being used to control the electric propulsion of the vehicle.

The control unit can then be configured to:

calculate the set rate linearly increasing with the power developed at a vehicle speed threshold value, interpolate a set rate between the origin and the set rate setpoint linearly increasing with the power developed at a threshold value, apply the interpolated setpoint rate if the vehicle speed is lower than the threshold value and the setpoint rate linearly increasing with the power developed if the vehicle speed is higher to the threshold value.

If the vehicle also includes a vehicle longitudinal position sensor, the control unit may include a second operating mode in which the angular position of the crankset is controlled by the longitudinal position of the vehicle.

The crankset is then characterized in that the control unit includes a second operating mode in which the angular position of the crankset is controlled by the longitudinal position of the vehicle.

This operating mode makes it possible in particular to better control and feel variations in the longitudinal position of the vehicle, particularly at low speed, by giving the impression of using a fixed gear bicycle, i.e. a 'fixie' ("fixed gear bicycle").

To do this, the control unit is configured to:

calculate the target rate in operating mode where the control unit controls the angular position of the pedals of the crankset to the longitudinal position of the vehicle, calculate the target rate linearly increasing with the power developed, apply the smallest of the two target rates to the vehicle speed.

Operation then automatically and smoothly switches between the two modes transparently for the user.

The control unit can further be configured to:

compare the vehicle speed to two distinct threshold values, with a lower threshold value and an upper threshold value;

apply the second operating mode if the vehicle speed is less than or equal to the lower threshold value;

apply the first operating mode if the vehicle speed is greater than or equal to the upper threshold value; and apply a third operating mode, when the speed of the vehicle is strictly greater than the lower threshold value and strictly less than the upper threshold value, the third operating mode making it possible to ensure the continuity of the rate as a function of the speed of the vehicle between the first and second operating modes.

This third transition operating mode then makes it possible to make the switch from one operating mode to another continuous and comfortable for the user.

In the third operating mode, the control unit is configured according to a particular embodiment to:

calculate a projected target rate at the threshold value greater than the current power;

define a target rate by interpolation as a function of the vehicle speed, between on the one hand the rate corresponding to the lower threshold value of the second mode, and on the other hand the rate of the first mode at the upper threshold value.

Interpolation makes it possible to obtain a connection between the set speeds between the two modes in a simple way.

The control unit may be configured to detect reverse pedal operation and trigger a braking mechanism when backpedaling is detected.

Thus no dedicated brake control is required, braking is carried out by actuation in the opposite direction of the pedal by the user.

Finally, the invention can also be applied to any type of device equipped with a crankset, and in particular to a fixed exercise device with a crankset, such as an exercise bike or elliptical bike.

BRIEF DESCRIPTION OF THE FIGURES

The invention will be clearly understood on reading the description which follows, the details of which are given solely by way of example, and developed in relation to the appended figures, in which identical references relate to identical elements.

DETAILED DESCRIPTION

Figure 1:
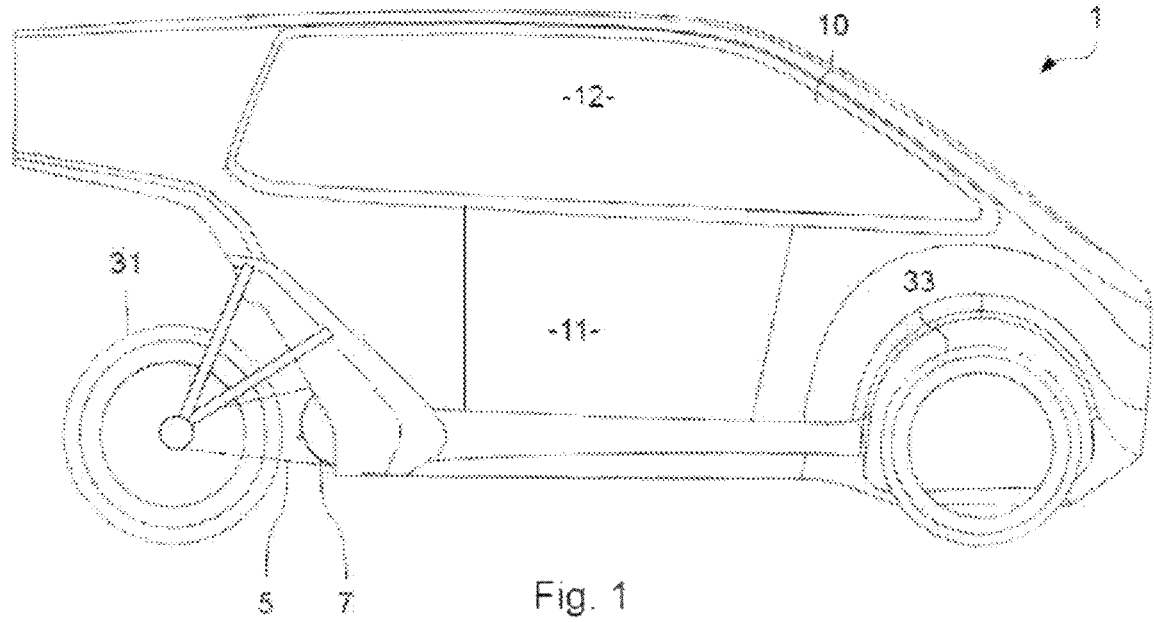
FIG. 1 is a side view of a vehicle according to a particular embodiment of the invention.

FIG. 1 is a side view of a vehicle 1 of the velomobile type according to the invention.

The vehicle 1 comprises a passenger compartment 10, including a bodywork closing the passenger compartment 10. The passenger compartment 10 has a general shape similar to that of a single-seater car, with side doors 11 and windows 12.

The vehicle 1 has wheels 31, 33, three in number, with a rear driving wheel 31 and two front steering wheels 33 (only one of the two front wheels 33 is visible). Other embodiments may use two or four wheels. In addition, one or two front wheels can be driven in addition to or as an alternative to the power of one or more rear wheels.

Figure 2:
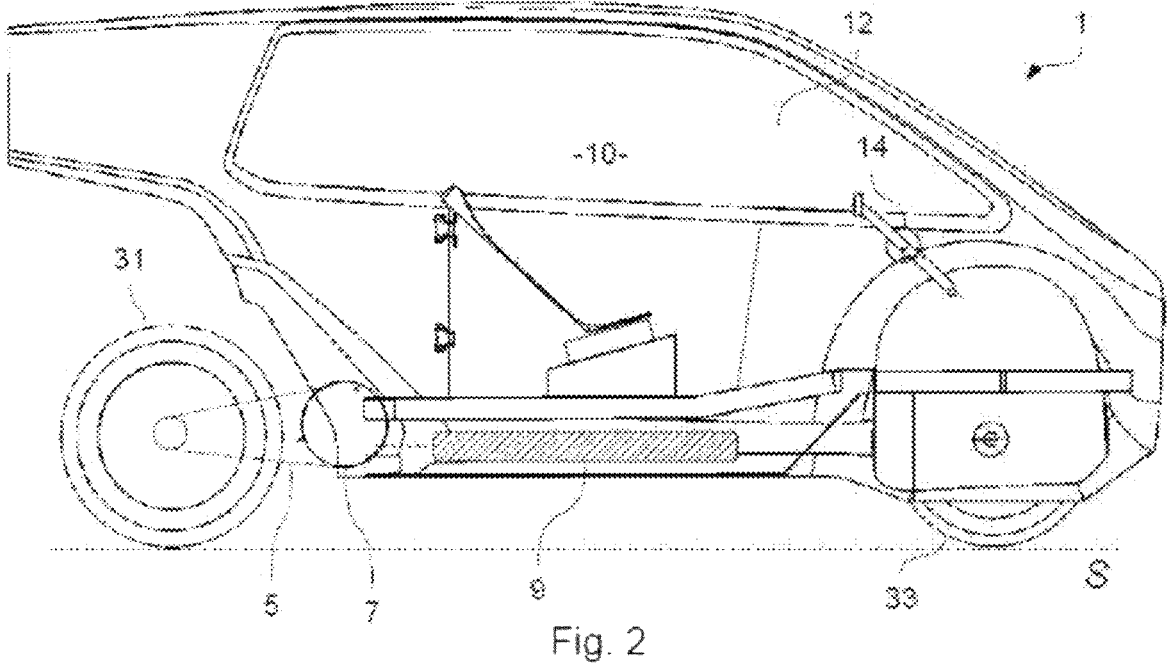
FIG. 2 is a longitudinal sectional view of the vehicle of FIG. 1.

FIG. 2 is a sectional view of the vehicle of FIG. 1. In FIG. 2 appears in particular the interior of the passenger compartment 10.

The rear wheel 31 is connected to a drive device 5 such as a belt, a chain or a gear. The drive device 5 is in turn connected to an electric motor 7 which sets the rear wheel 31 in motion, from electrical energy stored in batteries 9, located in a floor of the passenger compartment 10 in the example of FIG. 2.

The drive device 5 may in particular include a gearbox.

Recharging at least part of the electrical energy stored in the batteries 9 is obtained by means of a crankset 14.

Figure 3:
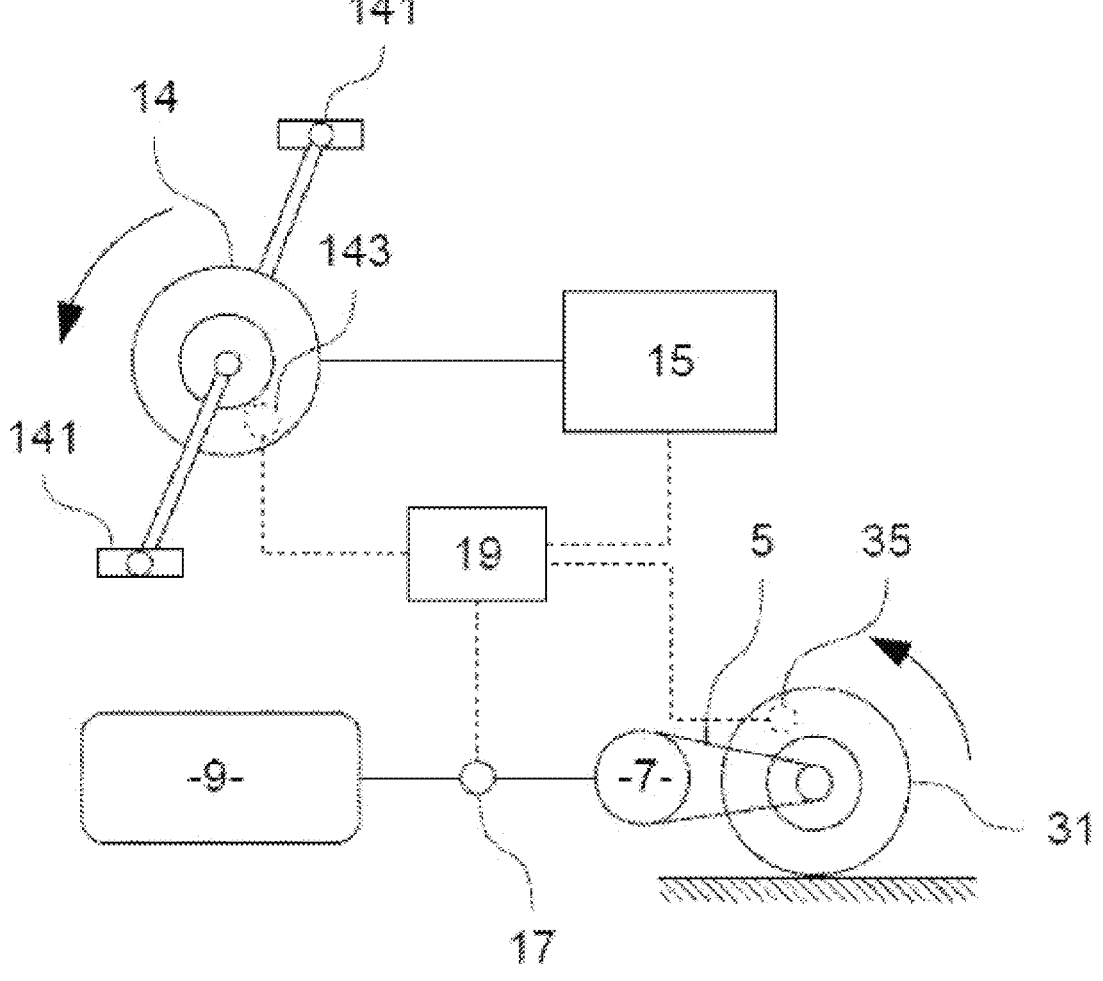
FIG. 3 is a schematic representation of the crankset of the vehicle of FIG. 1 and the elements interacting with said crankset when driving.

The crankset 14 is shown in FIG. 3 separately, with the electric motor 7, the drive device 5 and the rear wheel 31 drive.

The crankset 14 includes pedals 141, on which the user presses using his feet and legs for their movements. A haptic feedback generator 15 is connected to the crankset 14, or is even integrated into it. This haptic feedback generator 15 generates a generally resistive torque on the crankset 14. In certain particular embodiments, this haptic feedback generator 15 can be a motor.

The crankset 14 advantageously presents itself in the form of a reversible electric machine, in particular direct current, including a generator operating mode, in which a controlled electrical charge forms the haptic feedback generator 15.

The crankset 14 can, in its operation in generator mode, convert at least part of the mechanical energy supplied by the user into electrical energy stored in the battery 9 to be returned later in the form of acceleration of the wheels 31, 33 by means of the electric motor 7.

Other means of generating the resistive torque can for example be obtained by producing a dedicated braking device, for example mechanical friction, or a dedicated electric motor can be used, the action of said dedicated electric motor being opposite to that of the user at the level of the crankset 14.

The crankset 14 also includes means for estimating the rotation rate 143 of the crankset 14, for example by means of one or more angular position sensors of the pedals 141 with a simple temporal derivative.

FIG. 3 is a schematic representation of the elements of the vehicle involved in the regulation method according to the invention.

Said elements include: the crankset 14, the haptic feedback generator 15, the electric motor 7, the drive device 5, means for estimating the rate of rotation of the crankset 14, that is to say the means for estimating the rotation rate 143, for example the pedal position sensors 141 in the example of FIG. 3, the battery 9 and a control unit 19, connected to a current regulator device 17 placed between the battery 9 and the electric motor 7.

The electric motor 7 delivers its mechanical power to the wheel 31 via the drive device 5. The wheel 31 includes position sensors 35 of the wheel 31. The position sensors 35 are electronically connected to the control unit 19, and can in particular be used to determine whether the wheel 31 is blocking or slipping.

The control unit 19 is for example produced in the form of a processor connected to a programmable memory, and comprises means for actuating different electrical and electronic elements by means of transistors and controlled switches.

The control unit 19 in particular controls the rate of the crankset 14 to a set rate. The feedback in this control is generated by the haptic feedback generator 15 itself controlled by the control unit 19.

Thus, according to this control, if the rate of the crankset 14, measured by means of the position sensors 143 of the pedals 141, exceeds the set rate, the control unit 19 increases the resistive torque exerted by the haptic feedback generator 15 on the crankset 14. Conversely, if the measured rate of rotation of the crankset 14 is lower than the set rate, the control unit 19 reduces the resistive torque exerted by the haptic feedback generator 15 on the crankset 14.

By changing the resistive torque, the control unit increases or decreases the resistance felt by the user, which then changes the rate.

Figure 4:
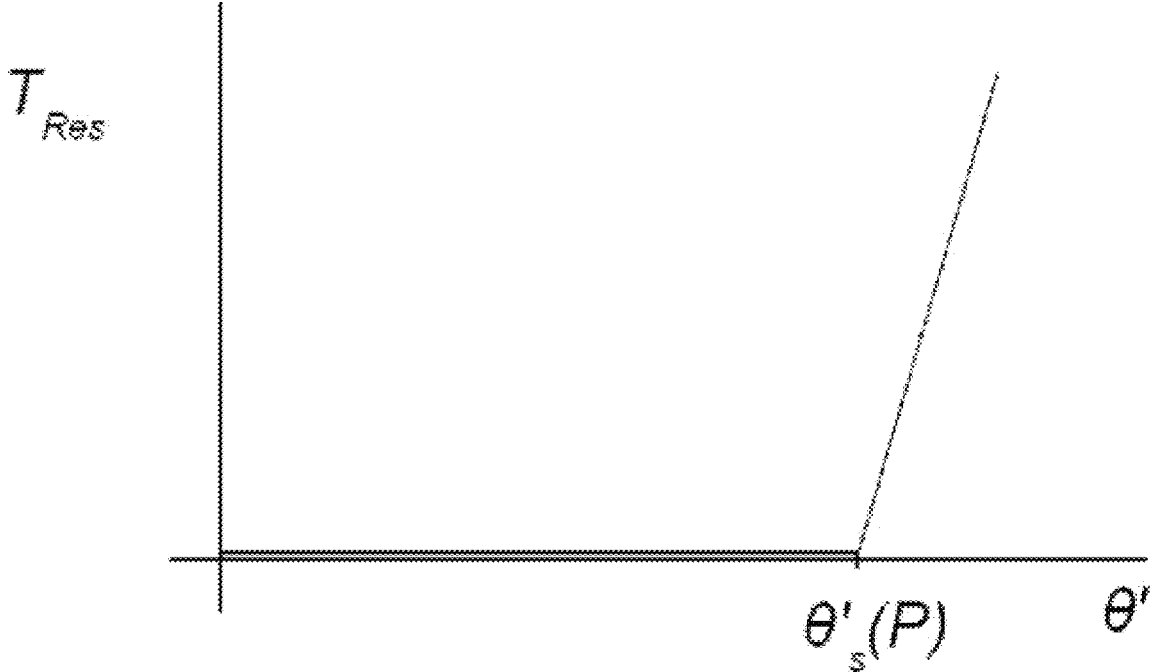
FIG. 4 is a graph of the target pedaling rate as a function of the power developed by the user.

FIG. 4 is a graph of the resistive torque $T_{Res}$ as a function of the pedaling rate $\theta'$. The resistive torque $T_{Res}$ is notably low, ideally zero, up to a threshold value $\theta s'$ which is the set rate. Beyond the set rate $\theta s'$ the resistive torque increases linearly with the steepest possible slope, ideally vertical corresponding to an increase in steps, from a low value, ideally zero, to the highest possible value, corresponding to the maximum torque deliverable.

At a rate lower than the threshold value $\theta s'$, freewheeling operation is simulated. At a rate higher than the threshold value $\theta s'$, the user feels strong opposition to any increase in rate, simulating acceleration with inertia of a vehicle felt as great, ideally infinite (vertical torque slope TRes). Beyond the threshold value $\theta s'$, the increase in the pedaling rate is mainly governed by the increase, by the control unit 19, of the threshold value $\theta s'$ forming the set rate.

If the crankset 14 can operate as a motor, the resistive torque TRes can be negative (that is to say motor) when the rate is lower than the threshold value θs'. In this embodiment, a driving torque exerted by freewheel imperfections is simulated. Indeed, in an imperfect freewheel we observe, due to friction and imperfect decoupling, a return drive of the pedals 141 by the wheel 31, i.e. a slightly driving torque.

The invention therefore provides that the set rate θs' varies as a function of the power P developed by the rotation of the pedaling, that is to say the power supplied by the user. More particularly, the invention provides that the control unit 19 proceeds, for example iteratively, to the following steps:

estimation of a power P provided by the rotation of the crankset 14; And decrease or increase in the predetermined set rate θs' so that the set rate θs' increases with the power provided by the rotation of the crankset 14.

Indeed, the applicant has noted that pedaling, to be pleasant and therefore sustained over the length, must remain in a rate range around 60 revolutions per minute (rpm), typically between 50 and 70 rpm, more particularly between 55 and 65 rpm.

When the effort becomes greater, that is to say the power developed becomes greater, it is advantageous to slightly increase the rate in parallel with the increase in the resistive torque TRes.

The power P can in particular be estimated by calculating the product of the rate θ' and the resistive torque $T_{Res}$ ($P=θ'.T_{Res}$). Alternatively, if the haptic feedback generator 15 is a controlled electrical load, a direct estimation can make it possible to estimate the power P developed by pedaling. For example, this estimate can be obtained by current and voltage sensors so as to calculate the electrical power dissipated by the electrical charge.

The power developed by a cyclist is between 0 and a few hundred watts. An experienced cyclist can develop up to 400 watts. An average or even poorly trained cyclist can develop up to 200 to 250 watts.

By low or low power values we therefore mean values less than a hundred watts, while by high or high power values we mean values greater than 150 to 200 watts or even more when the user is an experienced cyclist.

Figure 5:
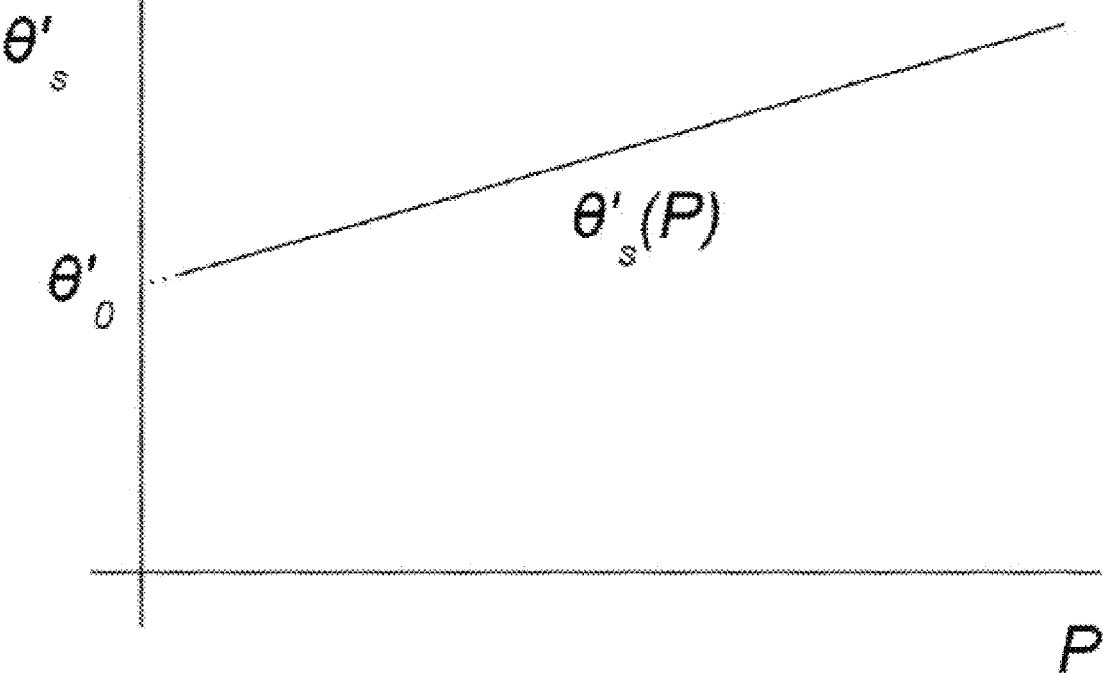
FIG. 5 is a graph of the resistive torque exerted on the crankset as a function of the pedaling rate.

FIG. 5 is a graph of the set rate θs' as a function of the power P.

The set rate θ' increases with the power P, for example linearly. The graph of the set rate θ$_s$'(P) is in particular a straight line, starting from a value at the origin θ$_0$' corresponding to an idle rate, without resistive torque, and having a positive slope between 0.05 and 0.25 rpm per watt, in particular from 0.08 to 0.15 rpm per watt, and more particularly around 0.10 rpm per watt.

The initial value θ$_0$' and the positive slope generally vary from one user to another depending on their sporting abilities in particular. It is possible to use an electronic memory to store several profiles, each including a value at the origin θ$_0$' and a slope value, the user being able to choose from these profiles.

These profiles can either be directly chosen by the user in a menu on an interface from pre-existing profiles, or these profiles can be adjusted and personalized then stored for each user.

According to a particular embodiment, the parameters of the set rate θs' such as the ordinate at the origin θ$_0$' and the slope, are determined by a preliminary calibration step. An interface, for example a dedicated screen or a terminal such as a telephone on which a dedicated application is installed and executed, can in particular display instructions, indications and values in real time for the user during the calibration.

For example, during initialization, or at a user request, the calibration can be based on tests similar to sports stress tests.

The calibration includes at least two tests, during which the user is invited to maintain a constant rate θ'. The control unit 19, during these tests, adjusts the resistive torque TRes so that the power P supplied by the user is constant, at least two different power values P1, P2. In particular, the resistive torque TRes is inversely proportional to the rate, the product of the resistive torque and the rate TRes.θ' being equal to the power P, imposed on the value P1 or P2 by the control unit 19.

The user, by maintaining a constant pedaling rate θ', then naturally adopts the ideal rate θ' for him at the power P1 or P2 considered.

The points, with the coordinates of the power value P1 or P2 and the corresponding ideal pedaling rate θ' are then used to determine the value at the origin θ0' and the slope of the graph in FIG. 5, in particular by linear interpolation.

Additional tests at other power values P can be carried out, the line of the graph in FIG. 5 then being adjusted to the points.

The operating mode previously described, with a set rate θs' linearly increasing with the power developed, is suitable for high values of power developed, which generally correspond to the high speeds V of vehicle 1.

In particular, other forms of graph of the set rate θs' than a simple straight line can be adopted: end to end segments, flattened curve, etc. As long as the target rate θs' increases slightly, remaining within the mentioned rate range, with the estimated developed power, pedaling remains pleasant and can be sustained over time even at high power.

According to one embodiment, the control unit 19 is configured to apply a different operating mode at low speeds of the vehicle 1. This embodiment is particularly indicated when said crankset 14 is used to control the speed of the vehicle 1.

Figure 6:
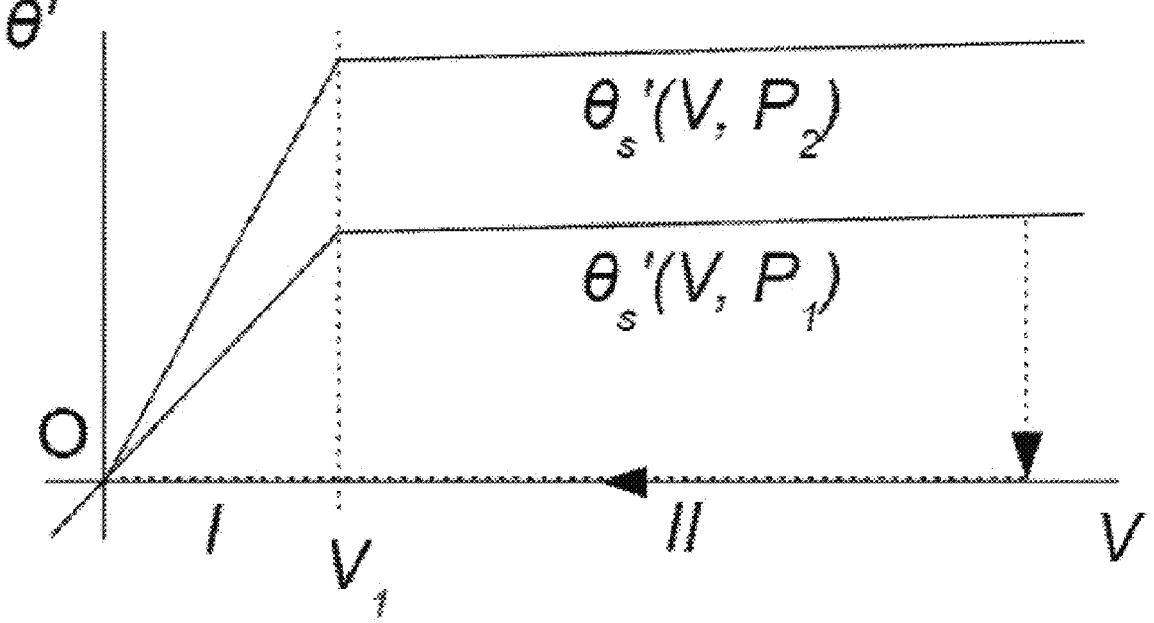
FIG. 6 is a graph of the target rate as a function of the speed of a vehicle controlled by the crankset.

FIG. 6 is a graph of the set rate θs' as a function of the speed V of the vehicle 1, in particular controlled by means of the crankset 14.

The horizontal axis of the speed V is separated into two domains I and II on either side of a threshold value V1.

At speed values V lower than the threshold value V1, in the first domain I, the control unit 19 imposes a second operating mode, in which the control unit 19 imposes a set rate θs' linear and proportional to the speed V of the vehicle 1, starting from the origin O. This linear set rate θs' is in particular obtained by linear interpolation between the origin O and the value of the set speed at the threshold value V1 of the first operating mode, at a set rate θs' depending linearly on the power.

During acceleration, the set rate θs' increases linearly with the speed of the vehicle, along a straight line which joins, at the threshold value V1, the straight line of the first operating mode. The control unit then switches to the first operating mode adopted in the second speed domain II, above the threshold value V1, with a set rate θs' increasing with the developed power P.

During operation in the first mode, at a target rate θs' linearly increasing with the developed power P, the rate θ' will vary little with the speed V. In the second domain II, values greater than the threshold value V1, the speed rate θ' is relatively independent of the speed V, and will depend in particular on the user's actions: acceleration or deceleration of the rate θ', braking, etc.

Said graph is here represented relatively flat and slightly increasing, corresponding to an acceleration at linearly increasing pedaling power P. In this second domain II of speeds V, the user will mainly feel variations in the resistive torque $T_{Res}$, the rate θ' remaining in the restricted domain previously mentioned, around 60 rpm, with a target rate θ' linearly increasing with the power P. Two plateaus corresponding to two power levels P1, P2 of the user are represented in FIG. 6.

More particularly, control unit 19 is configured to:
calculate the target rate θs' increasing linearly with the developed power P at a speed threshold value V1 of vehicle 1,
interpolate a target rate θs' between the origin O and the target rate θs' increasing linearly with developed power P at a threshold value V1, apply the target rate θs' interpolated if the speed of vehicle 1 is below the threshold value V1 and the target rate θs' increasing linearly with the developed power P if the speed of vehicle 1 exceeds the threshold value V1.

During deceleration, shown in dotted lines in FIG. 6, the control unit 19 advantageously simulates freewheeling until it stops.

The user, to decelerate, releases the pedals 141, which is shown in FIG. 6 by a substantially vertical segment from the set speed θs', to the value 0.

The speed V of vehicle 1 then gradually decreases. The motor 7 no longer receives current from the battery 9, the user can activate the brakes or the vehicle 1 can be slowed down simply by friction and possibly the slope of the ground on which the vehicle 1 is traveling. In FIG. 6, this is represented by a dotted segment, close to the abscissa axis, traveled from right to left over time: the pedals 141 do not rotate (rate θ' zero) while the speed V decreases.

At any time, the user can resume pedaling, but as long as he is at a rate θ' lower than the set rate θs', the control unit 19 does not generate any resistive torque TRes.

For negative speeds V and with reverse rotation of the pedals 141, therefore at negative rate θ', the control unit 19 can impose a third operating mode, in which it simulates, by means of the motor 7 and the feedback generator haptic 15, a fixed gear bicycle also called 'fixie' (i.e. 'fixed gear bicycle'), without a freewheel.

To do this, the vehicle 1 is provided with longitudinal position sensors, for example the position sensors 35 of the wheel 31.

In the 'fixie' operating mode, the control unit 19 controls the angular position of the pedals 141 of the crankset 14 to the longitudinal position of the vehicle 1. In particular, the set rate θs' beyond which a resistive torque TRes rapidly increasing is exerted (in a manner analogous to FIG. 4) is then directly proportional to the variations in the angular position of the wheel 31, and therefore to the speed V of the vehicle.

If the pedal 141 includes rate sensors θ' and/or speed V of the vehicle, a control of the rate θ' to the speed V of the vehicle 1 is of course an obvious alternative for those skilled in the art.

If the haptic feedback generator 15 includes means of exerting a motor torque on the crankset 14, it is possible to mutually control the angular positions of the wheel 31 and the pedals 141.

A movement of the wheel 31, for example under the effect of inertia or a slope, will then induce a proportional movement of the pedals 141, and a movement of the pedals 141 will induce a proportional movement of the wheel 31. In particular, by pedaling in the opposite direction, at negative rate, the user triggers a rotation of the wheel 31 in the direction inducing reverse gear, as indicated on the graph θ'(V) of FIG. 6, which continues to the left and at the bottom of the origin.

It is then possible, in the case of a vehicle 1 having several seats each with their pedals 14, to share the driver's set speed θs' with the passenger's pedals 14. An adjustment of the set speed θs' to the passenger's profile can be made to improve their experience.

In particular, the passenger will then have the impression of participating in the acceleration of the vehicle 1 and of feeling its accelerations and decelerations while providing additional current to charge the battery 9 and power the motor 3.

Figure 7:
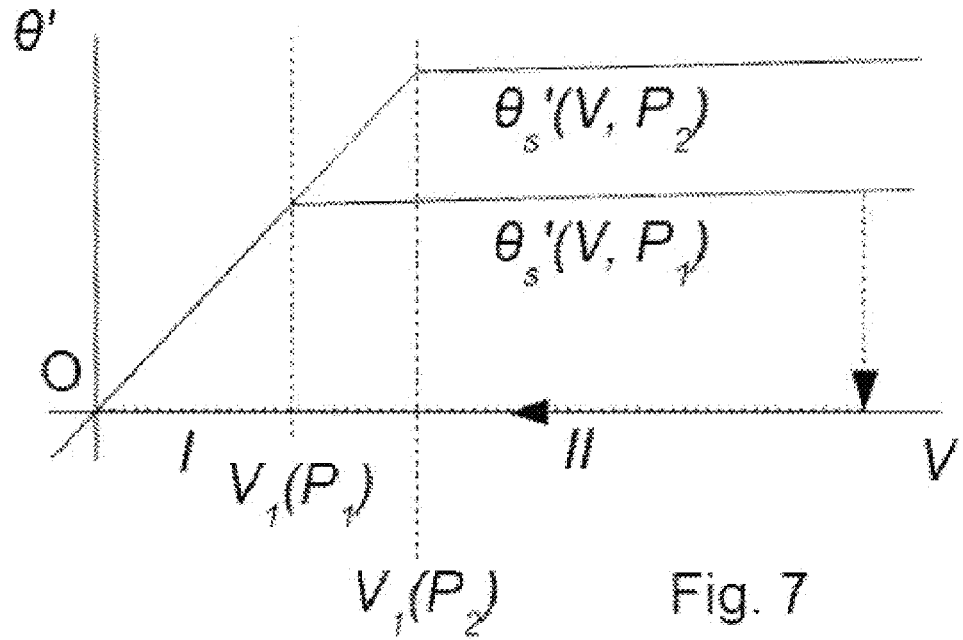
FIG. 7 is a graph of the target rate as a function of the vehicle speed in an alternative embodiment.

FIG. 7 illustrates another alternative embodiment in which the control unit 19 applies the 'fixie' operating mode to a range of positive speeds V of the vehicle 1.

At low speeds V, in particular lower than a threshold value V1 (P) dependent on the developed power, the control unit 19 adopts the "fixed" operating mode, where the control unit 19 slaves the angular position of the pedals 141 of the crankset 14 to the longitudinal position of the vehicle 1. In this "fixed" operating mode, the speed is therefore proportional to the speed V of the vehicle 1, with a fixed proportionality factor (the ratio of the simulated fixed gear).

The control unit 19 is notably configured to:
calculate the set rate θs' in 'fixie' operating mode,
calculate the set rate θs' linearly increasing with the developed power P,
apply the smaller of the two set rates θs' to the speed V of vehicle 1 considered.

The threshold value V1 (P) is therefore the point of intersection of the graphs of the two calculated target rates θs'. Two plateaus corresponding to two power levels P1, P2 of the user are represented in FIG. 7. These two plateaus cross the line of the set speed in 'fixie' mode at two different threshold values V1 (P1) and V1 (P2), corresponding to switching between different operating modes.

Figure 8:
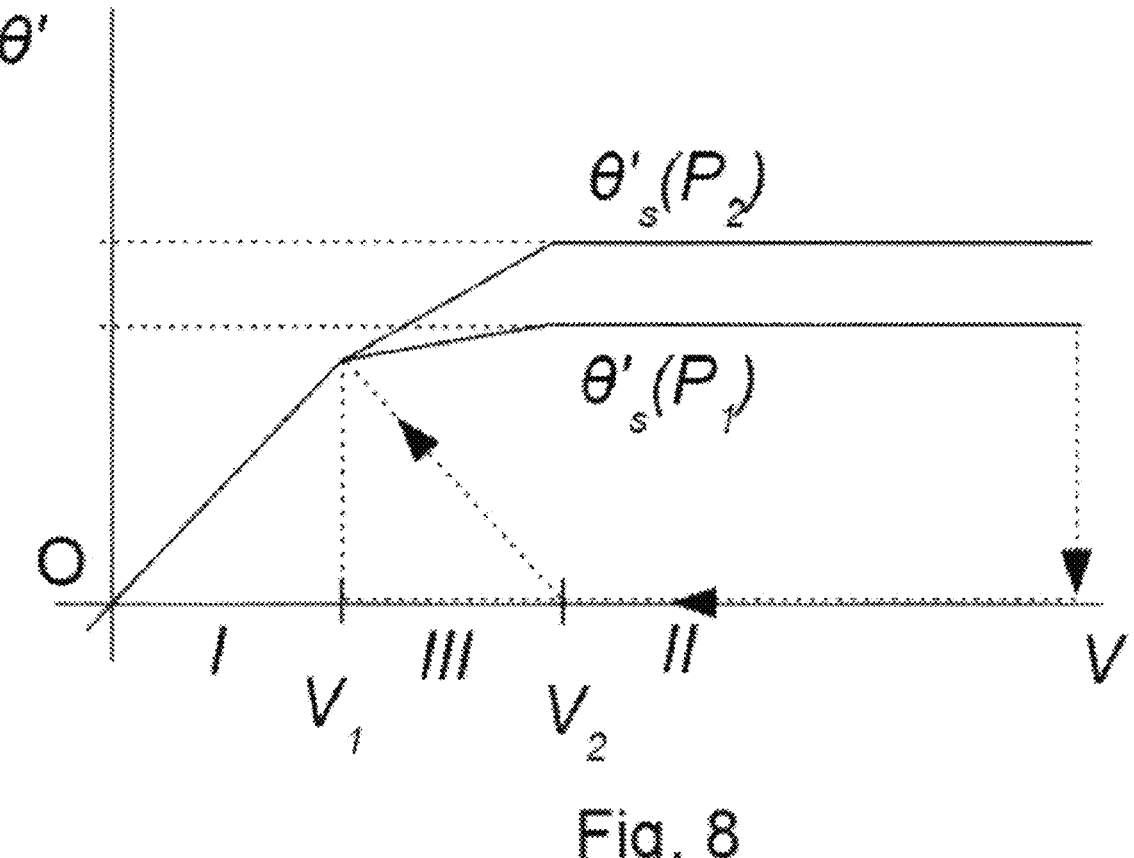
FIG. 8 is a graph of the target rate as a function of the vehicle's speed in an alternative embodiment.

FIG. 8 is a graph of the set rate θs' as a function of the speed V of the vehicle 1 of a third embodiment.

The horizontal axis of the speed V of vehicle 1 is here divided into three domains I, II and III with two distinct threshold values, the lower threshold value V1 and the upper threshold value V2.

The first speed domain I covers speed values lower than the lower threshold value V1. The second speed domain II covers speed values V greater than the upper threshold value V2. The third speed domain III covers the speed values V between the lower threshold value V1 and the upper threshold value V2.

The control unit 19 is then configured to:
compare the speed V of vehicle 1 to the threshold values V1, V2,
apply the third operating mode called 'fixie' if the speed V of vehicle 1 is less than or equal to at the lower threshold value V1 (domain I);
apply the first operating mode at a set rate θs linearly increasing with the developed power P if the speed V of vehicle 1 is greater than or equal to the upper threshold value V2 (domain II) and
apply an operating mode 'transition' when the speed V of vehicle 1 is strictly greater than the lower threshold value V1 and strictly less than the upper threshold value V2 (domain III).

In the 'transition' operating mode, the control unit 19 is for example configured to:
calculate a projected target rate at the threshold value V2 higher than the current developed power P; and define a set rate θs' by interpolation on the speed V of vehicle 1, between on the one hand the rate θ' corresponding to the lower threshold value V1 of the third 'fixie' mode, and on the other hand the rate θ from the first mode to the current power P at the upper threshold value V2.

In the case of FIG. 7, the interpolation is notably linear, but can alternatively be quadratic. Two curves corresponding to operation at a set rate depending linearly on the power P are represented in the domain above the upper value V2 (domain III) at two different power values P1, P2, corresponding to plateaus at different heights.

Two different interpolations are represented in the domain between the two threshold values V1, V2 (domain II).

During deceleration, freewheeling can again be simulated, at least in domains II and III corresponding to the 'transition' operating modes and at a set rate θs' linearly increasing with the developed power P.

According to a first embodiment, the freewheel, during deceleration, is adopted up to the lower threshold value V1 marking the return to operation in the third 'fixie' mode. Analogously to FIG. 6, a vertical segment from a high speed (from domain II), with a segment close to the abscissa axis, traveled from left to right over time, up to the value lower threshold V1.

When the speed V reaches the lower threshold value V1, operation then switches to 'fixie' mode. In this mode, to restore the control of the position or the rate of the pedals 141 to the position of the wheels 31, 33 or the speed of the vehicle 1, a motor torque is then exerted on the pedals 141 until they rotate at the set rate θs at the lower threshold value V1.

According to a preferred embodiment, during deceleration, the control unit 19 progressively controls the rate of the pedals 141 to the speed V of the vehicle 1 by means of the engine torque exerted on the crankset 14 between the threshold values V1, V2.

When decelerating from the upper threshold value V2 to the lower threshold value V1, the control unit 19 imposes a minimum rate. When the speed V of the vehicle is at the upper threshold value V2 the minimum rate is 0. When the speed V of the vehicle is at the upper threshold value V1 the minimum rate is equal to the set rate θs' imposed by the 'fixie' mode to the lower threshold value V1.

During deceleration, if the rate θ' is less than the minimum rate, the control unit 19 uses current from the battery 9 to exert a motor torque on the crankset 14.

If the rate θ' is greater than the minimum target rate (dotted lines) but lower than the target rate θs' during acceleration (solid lines), no torque is exerted on the crankset 14, the user feels a freewheel.

If the rate θ' is greater than the set rate θs' during acceleration (solid lines), a resistive torque is applied to the crankset 14 and the vehicle 1 accelerates again.

The third 'transition' mode then allows the user to switch between the two other modes ('fixie' and 'at a set rate θs' depending linearly on the power P') in a way that is barely or not perceived, and with continuity in the sensations.

For slowing down and braking, a particular embodiment provides an operation in which the user U brakes by backpedaling. In particular, similar to so-called 'Dutch' bicycles, backpedaling can only be carried out over an amplitude less than or equal to one revolution.

The control unit 19 is then configured to detect the actuation in the opposite direction of the crankset 14 in order to trigger braking of the vehicle 1. This braking can be carried out by a mechanical mechanism, such as disc brakes.

Preferably, braking is carried out by a resistive torque applied to the electric motor 7 of vehicle 1. When the need for braking is significant, mechanical braking can be applied with braking by resistive torque. For example, the control unit 19 can be configured to apply braking of a fixed value or braking increasing with the backpedaling angle applied to the crankset 14.

The haptic feedback generator 15 is advantageously configured to exert a resistive torque (opposite to backpedaling, that is to say motor with the previous orientation) increasing in absolute value with the angular difference between the initial position at the start of backpedaling. and the current position of the pedals 141.

This operating mode, similar to 'Dutch' bicycles, is particularly applicable during operations in zones II and III where a freewheel is simulated. In zone I called 'fixie', backpedaling is associated with reversing of vehicle 1.

To ensure the transition to this 'fixie' operating mode of zone I, a form of hysteresis is advantageous. In fact, the 'fixie' operating mode is indicated at low speed, for maneuvers for example.

When returning to this operating mode, the crankset 14 becomes a motor, due to the simulated direct coupling. If this return to the 'fixie' operating mode is carried out at too high a speed, the user U will feel said switch to motor mode of the crankset 14 as a sudden jolt, which will harm driving comfort and quality. felt from the vehicle.

In particular, starting from a situation of vehicle 1 stationary, or more generally operating in 'fixie' mode, said 'fixie' operating mode is adopted until the transition to zone III.

On the other hand, starting from a situation in which the operation simulates a freewheel (zones II and III), this freewheel is maintained until a zero speed or close to zero speed (typically of the order of one or a few kilometers per hour), located in zone I, is reached.

When the user U reaches this zero speed or close to zero speed, the haptic feedback generator 15 exerts a resistive or motor torque corresponding to the 'fixie' mode of zone I in which the angular positions of the pedals 141 and the wheels 31, 33 are coupled.

For example, if user U starts with vehicle 1 stopped, the initial operating mode will be 'fixie' mode as long as user U is in zone I. In this zone I of low speed V, the 'fixie' mode allows vehicle 1 to be easily maneuvered, with great precision in forward and reverse direction.

When user U accelerates, he pedals in the positive or motor direction with increasing power, until entering zone III (or II if no zone III is provided). The transition to this different operating mode, provided with a freewheel, is particularly transparent for the user U who is actively pedaling and therefore does not feel any change in the haptic feedback. The operating mode of zone III (or II) is, as previously mentioned, advantageous for traffic at high speed V.

When the user U stops pedaling or engages the braking system while backpedaling, the speed V decreases. With hysteresis, operation with a freewheel, corresponding to zone III or II, is adopted up to a low speed V, located in zone I close to zero or even zero. The 'fixie' mode is then adopted again, with low drive of the pedals 141 of the crankset 14 at said low speed V.

The user U can thus stop pedaling and feel a freewheeling deceleration, that is to say without movement on his part, until the vehicle 1 comes to a complete or almost complete stop. When he starts pedaling again, the 'fixie' operating mode will have been adopted in an imperceptible or barely perceptible manner by the user U.

According to an alternative embodiment, the braking power is proportional to the power developed when back-pedaling by the user. This operating mode is simpler, but does not allow abrupt braking without user effort, and is therefore more suitable for use in a vehicle at relatively low speed (bicycle, pedal boat, etc.).

Figure 9:
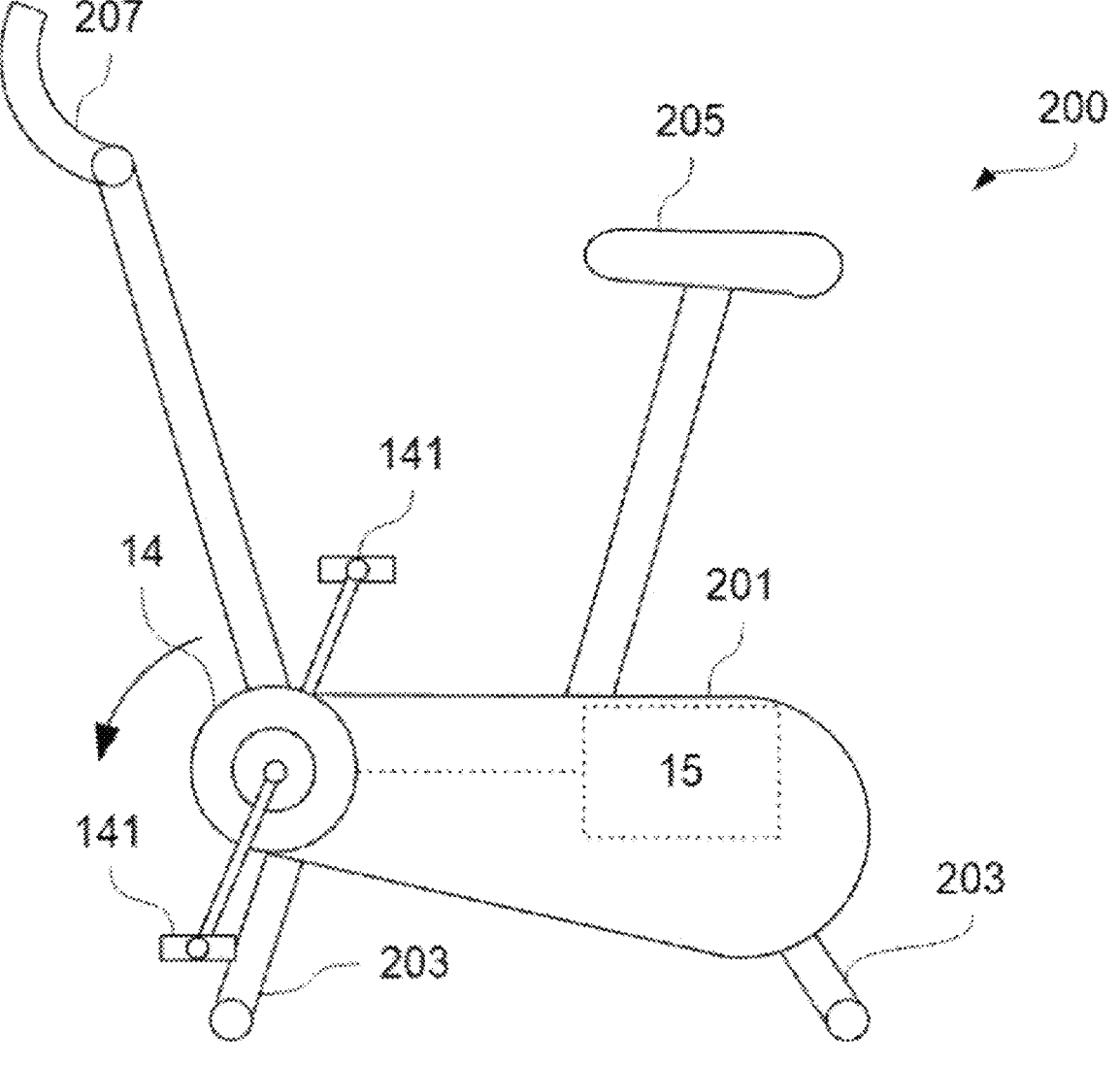
FIG. 9 is a schematic representation of a fixed exercise device including a crankset according to the invention.

FIG. 9 is a schematic representation of a fixed pedal exercise device 200, of the exercise bike or elliptical bike type.

The exercise device 200 is in particular an exercise bike, including a base 201 in which the crankset 14 is incorporated, feet 203 for support on the ground, a saddle 205 and handles 207.

The crankset 14 is then not used to control an electric motor 7 of vehicle 1. The crankset 14 then comprises a control unit 19 imposing, by means of a haptic feedback generator 15, a set rate θs' depending linearly on the developed power P essentially for regulating the rate θ'.

The crankset 14 according to the invention and the rate regulation method implemented by the control unit 19 of said crankset 14 make it possible to make pedaling at high power comfortable. The sustained effort represented by this high power can then be maintained for longer, and the benefits linked to exercise are increased.

Furthermore, by making the effort at high power sustainable, driving a vehicle 1 controlled at speed V by means of a crankset 14 is made more pleasant, especially when a high speed V of the vehicle 1 must be maintained by a significant effort on the crankset 14 for long durations.

The invention claimed is:

1. A crankset, comprising:
means for estimating a rate of rotation of the crankset;
a haptic feedback generator connected to the crankset and configured to deliver a resistive torque to the crankset; and
a control unit connected to the haptic feedback generator and to the means for estimating the rotation rate of the crankset, configured to control the rotation rate of the crankset at a set rate by modifying the resistive torque;
wherein the control unit regulates the set rate by estimating a power applied to a pedal by rotating the pedal and by reducing or increasing the set rate so that said set rate increases with the power applied to the pedal.

2. A crankset according to claim 1, wherein the set rate depends linearly on the power.

3. A crankset according to claim 2, wherein the set rate depends linearly on the power with a slope of between 0.05 and 0.25 rpm per watt.

4. A crankset according to claim 3 wherein the crankset comprises means for adjusting an ordinate at an origin (θ0') of the set rate (θs').

5. A crankset according to claim 1, wherein the control unit is configured to determine target rate parameters (θs') during calibration.

6. A crankset according to claim 1, wherein the crankset is produced in the form of a reversible electric machine, including a generator operating mode, in which an electrical load controlled by the control unit forms the generator of haptic feedback.

7. A crankset according to claim 6, wherein an electric current generated in generator operating mode is converted into a charge of an electric battery.

8. A crankset according to claim 6, wherein the reversible electric machine comprises a motor operating mode, in which electric current from an electric battery is used to generate a motor torque on the crankset.

9. An electric propulsion vehicle, further comprising a crankset according claim 1, and wherein the crankset is used to control the electric propulsion of the vehicle.

10. An electrical propulsion vehicle as in claim 9, wherein, the control unit is configured to:
calculate a target rate (θs') increasing linearly with a developed power at a speed threshold value of vehicle,
interpolate a target rate between an origin and the target rate increasing linearly with developed power at the speed threshold value,
apply the target rate interpolated if a speed of vehicle is below the threshold value and the target rate increasing linearly with the developed power if the speed of vehicle exceeds the threshold value.

11. An electrical propulsion vehicle according to claim 9, further comprising a longitudinal position sensor of the vehicle wherein the control unit comprises a second operating mode in which an angular position of the pedal is controlled by a longitudinal position of the vehicle.

12. An electrical propulsion vehicle according to claim 10, wherein the control unit is configured to:
calculate the set rate in operating mode where the control unit 19 controls the angular position of the pedals of the crankset to the longitudinal position of the vehicle,
calculate the set rate linearly increasing with the developed power,
apply a smaller of the two set cadences at the speed of the vehicle.

13. An electrical propulsion vehicle according to claim 11, wherein the control unit is configured to:
compare the speed of vehicle with two separate threshold values, with a lower threshold value and an upper threshold value;
apply the second operating mode if the vehicle speed is below or equal to the lower threshold value;
apply the set rate if the vehicle speed exceeds or equals the upper threshold value; and
apply a third operating mode, when the vehicle speed is strictly above the lower threshold value and strictly below the upper threshold value, the third operating mode allowing to ensure continuity of the set rate according to the vehicle speed between the first and second operating modes.

14. An electrical propulsion vehicle according to claim 13, wherein in the third operating mode, the control unit is configured to:
calculate a setting rate projected at the threshold value exceeding a current power;
define a setting rate by interpolation according to vehicle speed, between on the one hand a rate corresponding to the lower threshold value of the second operating mode, and on the other hand a rate of the first operating mode at the upper threshold value.

15. An electrical propulsion vehicle according to claim 9, wherein the control unit is configured to detect reverse actuation of the crankset and trigger a braking mechanism when backpedaling is detected.

16. An apparatus comprising:
a fixed pedal exercise bike or elliptical bike, comprising a crankset according to claim 1.

* * * * *